United States Patent [19]

Williams

[11] 3,824,765
[45] July 23, 1974

[54] GAS AND LIQUID SEPARATOR

[75] Inventor: Rodney A. Williams, Los Alamitos, Calif.

[73] Assignee: J. A. Campbell Company, Long Beach, Calif.

[22] Filed: July 24, 1973

[21] Appl. No.: 382,207

[52] U.S. Cl............................ 55/1, 55/337, 55/421, 55/452, 55/461
[51] Int. Cl............................................. B01d 45/12
[58] Field of Search ........... 55/1, 97, 177, 191, 204, 55/337, 421, 447, 452, 456, 457, 461

[56] References Cited
UNITED STATES PATENTS
1,505,744  8/1924  Stebbins............................. 55/452
1,878,052  9/1932  Wilson et al........................ 55/452
2,344,898  3/1944  Rathbun............................. 55/452
2,511,967  6/1950  Campbell............................ 55/458
3,555,820  1/1971  Cramer et al....................... 55/177

Primary Examiner—Bernard Nozick

[57] ABSTRACT

An improved apparatus for separating entrained liquid from a stream of gas by sequentially subjecting the stream to centrifugal action in first one direction and then in a second opposite direction, and the entrained liquid collecting on multiple screens as a result thereof. The separated liquid drains downwardly on the screen by gravity to a quiescent zone where it is free to flow to a settling tank, with the liquid after entering the tank stratifying into layers of oil and water that may be selectively removed from the tank by first and second valve outlets. The separated liquid when in the quiescent zone is substantially free from the action of the flowing stream as the latter flows through first and second annulus shaped spaces. The gas substantially free from entrained liquid flows upwardly from the apparatus to a desired destination.

5 Claims, 11 Drawing Figures

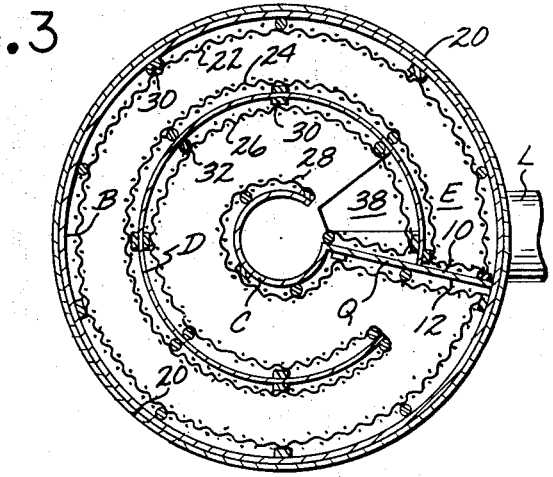

PATENTED JUL 23 1974 3,824,765

GAS AND LIQUID SEPARATOR

BACKGROUND OF THE INVENTION

1. Field of the Invention

Improved gas and liquid separator.

2. Description of the Prior Art

In the past, various liquid and gas separators have been devised and used, such as the separator disclosed and claimed in the J. A. Campbell U.S. Pat. No. 2,755,886 that issued on July 24, 1956. However, such prior art devices have the operational disadvantage that liquid after being separated from the stream of gas, continues to be subjected to the flow of the latter, and it is difficult to obtain a complete separation of the liquid and gas. Furthermore, in such prior art devices, the stream of liquid and gas is subjected to centrifugal force in but a single direction, and this in turn limits the extent to which the entrained liquid is separated from the gas.

The primary purpose in devising the present invention is to supply an improved gas and liquid separator in which the stream of gas with entrained liquid is initially subjected to centrifugal force within a first annulus space in a first direction, and then caused to traverse a second annulus space of lesser radius than the first in a second and opposite direction to exert a greater centrifugal force on the entrained liquid to obtain optimum separation of the latter from the gas prior to the gas being discharged through the upper portion of the apparatus to a desired destination.

Another object of the invention is to furnish a gas and liquid separator, in which the liquid, after being separated from the gas, flows by gravity to a quiescent zone in the lower portion thereof, and the liquid when within the zone being free to drain therefrom by gravity into a settling tank in which it stratifies into layers of water and oil that may be selectively removed from the tank by first and second outlets.

A still further object of the invention is to obtain maximum flow of separated liquid from the quiescent zone by gravity, and without this flow of liquid being impeded by the action of the stream of gas as the latter circulates at a relatively high velocity through the first and second annulus shaped spaces. Yet another object of the invention is to provide a prefabricated gas and liquid separating unit that may be disposed inside a tank having upper and lower domed end, with the upper domed end receiving gas substantially free of entrained liquids, and the lower domed end serving as a settling tank for separated liquid that stratifies therein into layers of oil and water.

SUMMARY OF THE INVENTION

An improved apparatus for separating entrained liquid from a stream of gas by centrifugal action, in which the stream is sequentially subjected to flow through a first annulus shaped space in a first direction, and then through a second annulus shaped space in a second direction that is opposite to the first direction.

The stream in traversing the first and second annulus shaped spaces is subjected to substantial centrifugal forces that cause entrained liquid to collect on multiple curved screens, and flow downwardly on the latter towards the bottom of the separator by gravity.

The liquid, upon approaching the bottom of the aparatus enters a quiescent zone substantially free from the action of the moving stream of gas as the latter traverses the first and second annulus shaped spaces. Separated liquid flows from the quiescent zone to a settling tank where it stratifies into layers of water and oil that may be selectively removed therefrom by first and second valved outlets. Gas substantially free from liquid discharges from the upper part of the apparatus to a desired destination.

BRIEF DESCRIPTION OF THE DRAWINGS

FIG. 1 is a side elevational view of the gas and liquid separator;

FIG. 2 is a transverse cross sectional view of the apparatus taken on the line 2—2 of FIG. 1;

FIG. 3 is a second transverse cross sectional view of the apparatus taken on the line 3—3 of FIG. 1;

FIG. 8 is a fragmentary cross sectional view of the portion of the apparatus within the confines of the circle shown in phantom line in FIG. 6 and identified by the numeral 8;

FIG. 9 is a fragmentary transverse cross sectional view of the lower portion of the apparatus and taken on the line 9—9 of FIG. 8;

FIG. 10 is a fragmentary transverse cross sectional view of one of the liquid collecting baffles;

FIG. 11 is a fragmentary perspective view of a section of screen secured to one of the spaces, with the spaces being secured to one of the shells that defines either the first or second annulus shaped space.

DESCRIPTION OF THE PREFERRED EMBODIMENTS

The gas and liquid separator unit A as may best be seen in FIGS. 4, 5, 6 and 7 includes a first outer cylindrical shell B, a second inner cylindrical shell C and a third cylindrical shell D that is intermediately disclosed between the two first mentioned shells. The shells B, C, and D are concentrically arranged relatively to one another, are of substantially equal length, and are vertically disposed to define first and second annular spaces E and F therebetween.

Figure 5:
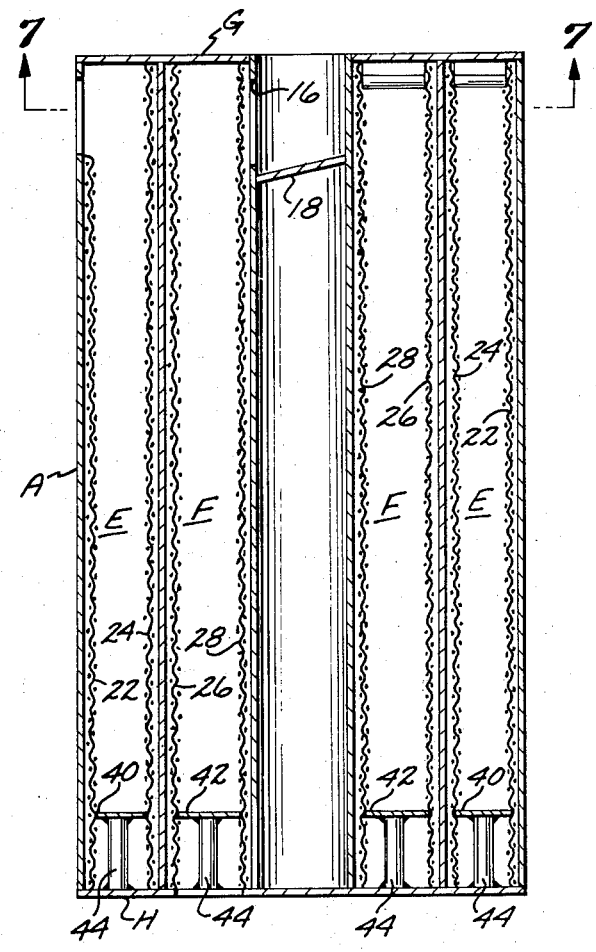
FIG. 5 is a longitudinal cross sectional view of the gas and liquid separating portion of the apparatus taken on the line 5—5 of FIG. 4.

The shells B, C, and D as may be seen in FIG. 5 have upper and lower circular plates G and H secured to the ends thereof by welding or the like. The lower plate H as may be seen in FIG. 1 as a settling tank J situated therebelow, with this tank permitting liquid (not shown) to accumulate therein to stratify into an upper layer of oil (not shown) and a lower layer of water (not shown). The settling tank J has a water outlet K provided therein and an oil outlet L, with these two outlets normally being closed by valve means (not shown). The separator A may be supported in a vertical position by any type of conventional base M as shown in FIG. 1.

A dome shaped head N is disposed above the upper plate G as shown in FIG. 1, and has a gas outlet O extending from the upper portion thereof through which gas may be discharged by pipe means (not shown) to a desired destination. The outer shell B as may be seen in FIG. 1 has an inlet P for the stream of gas and liquid, with the inlet being located in the upper portion of the outer shell. In FIGS. 2 and 3 it will be seen that a vertically positioned first barrier Q is disposed within the separator A, with the first barrier Q extending from the inner shell C to the outer shell B, and the barrier having first and second sides 10 and 12 respectively, as shown in FIG. 3.

Figure 4:
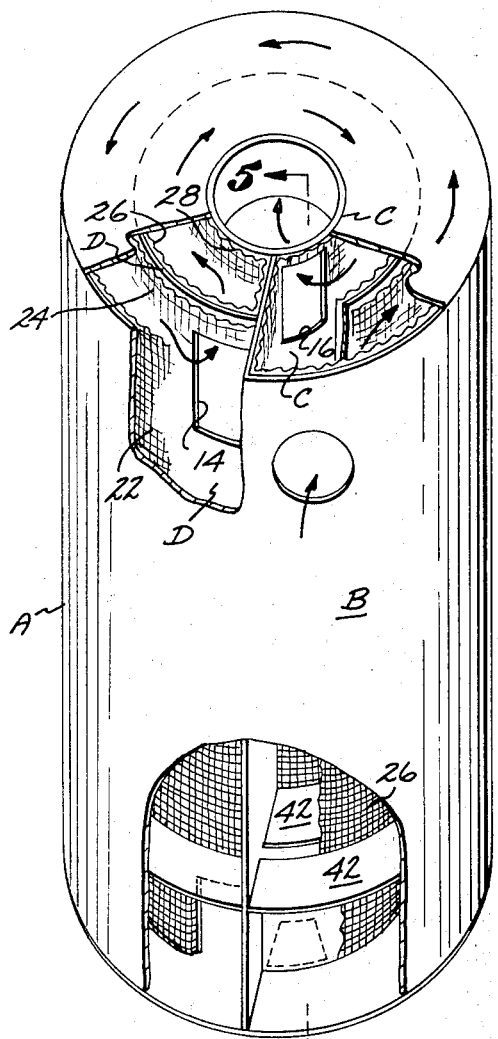
FIG. 4 is a perspective view of the gas and liquid separating portion of the apparatus, and illustrating the flow of a stream of gas with entrained liquids therethrough.

Th first side 10 as will be seen in FIG. 3 forces a stream of gas and entrained liquid flowing into the first annulus shaped space E through the inlet P to flow therearound in a counter clockwise direction until the gas encounters a first opening 14 as may best be seen in FIG. 4 that is formed in the upper portion of the intermediate shell B, with the stream due to the second side 12 of the first barrier Q being forced to flow clockwise within the second annulus shaped space F until it encounters the first side 10 of first barrier Q, to enter a second opening 16 formed in the upper portion of the inner shell C. The stream of gas entering the second opening 16 flows upwardly in the inner shell into the confines of the domed end N, where the gas may escape through the gas discharge outlet O. A second barrier 18, preferably at a slight angle with the horizontal extends transversely across the upper interior portion of the inner shell C. Second barrier 18 prevents flow of gas downwardly in the inner shell C. The second barrier 18 is positioned at a slight angle, to cause any liquid that may be deposited thereon to drain therefrom by gravity into the second confined space F.

In construction of this invention it has been found convenient to dispose the assembly shown in FIG. 4 within the confines of a tank that includes a cylindrical shell 20 that has the domed end N secured to the upper edge thereof and the settling tank J secured to the lower edge of the shell.

The assembly shown in FIG. 4 is disposed within the shell 18, prior to the domed end N being welded or otherwise secured to the shell 18. The construction shown in FIG. 1 is merely one of convenience, and is not essential for the successful operation of the gas and liquid separator A that is to be situated within the confines of a tank as illustrated. First and second curved screens 22 and 24 are secured to the interior surfaces of the first shell B and the exterior surface of the intermediately disposed shell D, and the screens being held in spaced relationship therewith by a number of vertically extending circumferentially spaced rods 30 and 32. The rods 30 are of rectangular transverse cross section, while the rods 32 are of circular transverse cross section. In FIG. 11 a method of securing one of the screens, such as the second screen 24, to the exterior surface of the intermediately positioned shell D is illustrated. A washer 34 is placed in abutting contact with the screen 24 and radially aligned with a spacer 30. A welding bead 36 is then formed within the confines of the washer that extends to the spacer 30 after the screen that underlies the opening in the washer has been burned therefrom. The spacers 30 serve to hold the screen 22, 24, 26 and 28 in spaced relationship with the adjoining surfaces of the shells, while the spacers 32 merely serve as such, and normally do not have the screens rigidly secured thereto, but only in pressure contact therewith.

The third and fourth curved screens 26 and 28 as can best be seen in FIG. 2 are secured to the interior surface of the intermediately disposed shell D and the exterior surface of the inner shell C in spaced relation therewith by the same means as above described.

When a stream of gas and entrained liquid is discharged into the first annulus shaped space E, it is forced to flow in a counter clockwise direction therethrough, and the entrained liquid being subjected to centrifugal force that tends to force the liquid outwardly to contact the first curved screen 22, although some of this liquid may contact the second screen 24. After such contact the entrained droplets of liquid tend to adhere to the first and second screens 22 and 24 and flow downwardly thereon towards the lower plate H of the unit shown in FIGS. 4 and 5. The stream of gas and entrained liquid, after a portion of the entrained liquid has been removed therefrom enters the second opening 16 and now traverses the second annulus shaped space F in a direction opposite to that it travelled while flowing through the first confined space E. The radius of curvature of the second annulus space F is less than that of the first confined space E. The stream of gas and liquid as it flows through the first confined space E and second confined space F travels at substantially the same velocity, but when in the second confined space is subjected to travelling a more curved path than when in the first annulus shaped space E. Thus, the entrained particles of liquid in the stream of gas as it traverses the second annulus shaped space tend to be subjected to a greater centrifugal force that forces them to impinge on the third and fourth screens and be removed from the stream of gas prior to the latter discharging upwardly through the inner shell C into the confines of the domed end N where it escapes through the gas discharge O. The flow of the stream containing both gas and liquid is illustrated by arrows in FIG. 4.

Figure 7:
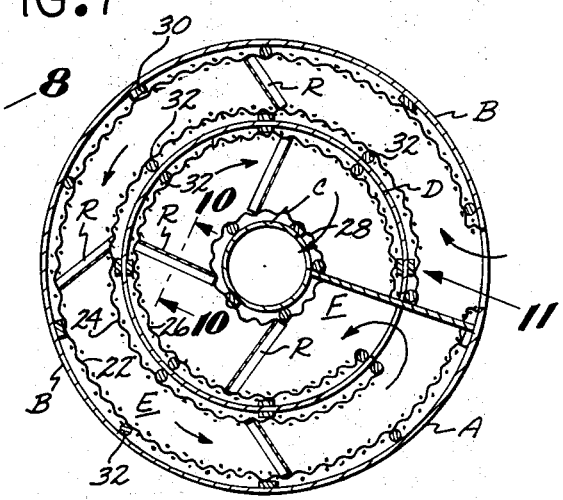
FIG. 7 is a transverse cross sectional view of the apparatus taken on the line 7—7 of FIG. 5.

In FIGS. 7 and 10 it will be seen that a number of elongate baffles R are secured to the upper plate G and depend downwardly therefrom, with the baffles extending transversely across the first and second annulus shaped spaces E and F in circumferentially spaced relationship. The lower end of the intermediately positioned shell D has an opening 36 formed therein through which liquid that flows downwardly to the lower plate H may pass to enter an opening 38 formed in the lower plate H and then drop due to gravity into the settling tank J.

Figure 6:
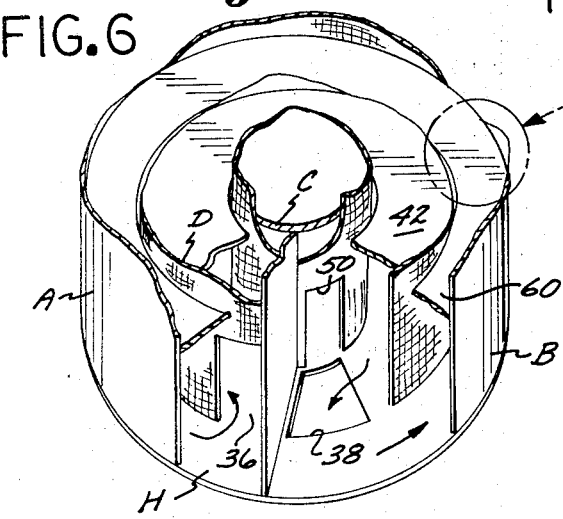
FIG. 6 is a fragmentary perspective view of the lower portion of the apparatus, with sections thereof cut away to illustrate the structure of the quiescent zone in the apparatus, and the manner by which liquid that is collected at the bottom of the apparatus may flow therefrom.

To permit maximum flow of liquid from the lower portion of the gas and liquid separating unit as shown in FIGS. 4, 5 and 6 it is highly desirable that a quiescent zone O be provided in which the liquid collecting in the lower portion of the assembly above the lower plate H will not be subjected to any appreciable action by the stream of gas and liquid as it flows through the first and second annulus shaped spaces E and F. To that end, first and second arcuate shaped plates 40 and 42 are provided as shown in FIG. 5 that conform in general to the transverse cross section of the first and second annulus shaped spaces E and F. The plates 40 and 42 are supported on the upper ends of pedestals 44 as may be seen in FIG. 5, which pedestals extend upwardly from the lower plate H. The first and second plates 40 and 42 extend between the screens as illustrated in FIG. 5, and permit entrained liquid in the form of droplets to flow downwardly on the screens into the quiescent zone O, but prevent the liquid after it has entered this zone being subjected to the whirling action of the stream of liquid and gas as the latter traverses the first and second annular shaped spaces E and F.

The baffles R may take a variety of shapes, but the configuration shown in FIG. 10 has been found to be most effective. In the form, the baffle R shown in FIG. 10 includes a depending portion 48 that is of curved configuration and developed on the outer end thereof into a loop 50. The baffles are positioned in the annulus shaped spaces E and F in such a direction that entrained liquid droplets carried with the stream of gas impinge on the baffle R in the direction shown by the arrow in FIG. 10. The droplets of liquid 52 collected on the baffles R flow downwardly on the baffles and from the open ends of the baffles flow downwardly on one of the screens by gravity towards the lower plate H. The entrained liquid whether collected on the baffles R, or on the screens, all flows downwardly on the screens towards the lower plate H to enter the quiescent zone O. The separated liquid in zone O flows to the openings 36 and 38 to enter the settling tank J, where the liquid stratifies into layers of oil and water (not shown). Should it be desired, an opening 50 may be formed in the lower portion of the inner shell C as illustrated in FIG. 6.

The use and operation of the invention has been explained previously in detail, and need not be repeated.

I claim:

1. In an apparatus for separating entrained liquid that may contain both oil and water from a stream of gas, which apparatus is of the type that includes; upper and lower vertically spaced circular plates that have inner, outer and intermediately positioned cylindrical shells extending therebetween to define first and second annulus shaped vertically extending spaces, first, second, third and fourth curved screens secured to said cylindrical shells and spaced therefrom, first means for discharging said stream into an upper portion of said first annulus space, the improvement for more effectively separating said liquid oil and water from said gas as said stream flows through said apparatus said improvement comprising:
    a. a vertically disposed first barrier in said apparatus, which first barrier has first and second sides and extends radially from said inner shell to said outer shell transversely across said first and second annulus shaped spaces, said first side forcing said stream entering said first annulus space to slow therein in a first direction until it contacts said second side that directs said stream through a first opening in said intermediate positioned shell into said second annulus space where said stream flows in a second direction opposite to said first direction until said stream contacts said first side of said first barrier and is directed through a second opening in said inner shell, with said stream as it flows in opposite directions in said first and second being subjected to centrifugal forces that cause said entrained liquid to collect on said first, second, third and fourth screens and flow downwardly thereon towards the lower portion of said apparatus due to gravity;
    b. gas discharge means in communication with an upper portion of said inner shell through which gas discharges after said entrained liquid has been substantially removed therefrom due to said centrifugal force to which said stream is subjected in traversing said first and second annulus shaped spaces;
    c. a second barrier that spans the interior of said inner shell below said second opening and forces said stream entering said inner shell to flow upwardly therein to said gas discharge means;
    d. a settling tank secured in a fixed relationship with said lower plate, said settling tank receiving liquid that has been separated from said gas in said first and second annulus shaped spaces through a third opening in said lower plate, said liquid entering said tank stratifying into a lower layer of water and an upper layer of oil;
    e. first means for withdrawing said layer of water from said settling tank;
    f. second means for withdrawing said layer of oil from said settling tank; and
    g. third means in the lower portion of said first and second annulus shaped spaces for maintaining a quiescent zone therebelow in which said liquid may collect and flow to said third opening without being subjected to the movement of said stream as the latter flows through said first and second annulus shaped spaces.

2. An apparatus as defined in claim 1 in which said third means comprise:
    h. first and second rigid arcuate substantially horizontal plates that extend transversely between said first and second screens and said third and fourth screens at an elevated position above said bottom plate; and
    i. fourth means for rigidly supporting said first and second arcuate plates above said lower plate, said arcuate plates and said lower plate cooperating to define said quiescent zone therebetween.

3. An apparatus as defined in claim 2 in which said fourth means are a plurality of circumferentially spaced vertical pedestals that extend upwardly from said lower plate and are secured on the upper ends thereof to said first and second arcuate plates.

4. An apparatus as defined in claim 3 in which said third opening is formed in said lower plate between said inner shell and said intermediately positioned shell, and said intermediately positioned shell has a fourth opening in the lower portion thereof to permit liquid collecting on said lower plate between said intermediately positioned shell and said outer shell to flow through said fourth opening to said third opening and then drop downwardly due to gravity into said settling tank.

5. A method of separating an entrained liquid that may contain both water and oil from a stream of gas that comprises the steps of:
    a. directing said stream with said entrained liquid into said first annulus shaped space to flow in a first direction therein to subject said entrained liquid to a first centrifugal force to separate said liquid from said gas;
    b. directing said stream of gas and liquid remaining entrained therewith after it has traversed said first annulus shaped space into a second annulus shaped space where said gas and remaining entrained liquid travel in a second direction opposite said first direction to be subjected to a second centrifugal force to separate the remaining entrained liquid from said gas;
c. allowing said gas free of said entrained liquid to escape from said second annulus shaped space;
d. allowing said entrained liquid that separates from said stream of gas in said first and second annulus shaped spaces to flow downwardly therein by gravity to a quiescent zone where said liquid is not subjected to the action of said gas as the latter flows through said first and second annulus shaped spaces;
e. removing said liquid as it collects in said quiescent zone and directing said liquid into a confined space;
f. allowing said liquid to stratify into layers of oil and water in said confined space; and
g. separating said layers of oil and water from one another after they have accumulated in said confined space.

* * * * *